United States Patent [19]

Bonacorsi

[11] Patent Number: 4,477,217
[45] Date of Patent: Oct. 16, 1984

[54] DRILL AND THREAD FORMING SCREW
[75] Inventor: Jerry Bonacorsi, Rockford, Ill.
[73] Assignee: Rockford Products Corporation, Rockford, Ill.
[21] Appl. No.: 269,108
[22] Filed: Jun. 1, 1981
[51] Int. Cl.³ .......................................... F16B 25/00
[52] U.S. Cl. ................................................ 411/387
[58] Field of Search ............... 411/387, 417, 416, 420, 411/421; 408/230

[56] References Cited

U.S. PATENT DOCUMENTS

| | | |
|---|---|---|
| 2,015,159 | 9/1935 | Rosenberg . |
| 3,093,028 | 6/1963 | Mathie . |
| 3,221,588 | 12/1965 | Wieber . |
| 3,682,038 | 8/1972 | Lejdegård ........................... 411/387 |
| 3,882,756 | 5/1975 | Sauer et al. ......................... 411/387 |

FOREIGN PATENT DOCUMENTS

| | | | |
|---|---|---|---|
| 241588 | 7/1960 | Australia ............................ 411/387 |
| 696358 | 10/1964 | Canada ............................... 411/387 |

*Primary Examiner*—Richard J. Scanlan, Jr.

[57] ABSTRACT

A drilling and thread forming screw including a shank portion with a head at one end and a drill point at the other end. The shank includes a threaded portion having a minor diameter and a major diameter. The drill point defines a segment of a cone having a base and a point. The base intersects the shank at the minor diameter of the shank. This screw is adapted to drill into a substrate up to the minor diameter of the shank and then to form female threads in the substrate.

4 Claims, 5 Drawing Figures

DRILL AND THREAD FORMING SCREW

BACKGROUND OF THE INVENTION

Screws of the type with which the present invention is concerned are commonly used to drill and tap holes in sub-structures such as steel wall studs or other sheet metal, for applications such as attaching insulation to a decking or roof. Fasteners of this type generally include a point at one end of the fastener for initiating a hole in the sub-structure. Moving up the shank, the fastener generally includes male threads to tap the hole in the sub-structure and terminates in a head having a recess into which a conventional driving tool can be inserted.

Examples of known fasteners include the screw disclosed in U.S. Pat. No. 2,015,159 "Rosenberg", hereby incorporated by reference. The Rosenberg screw has a piercing point which is designed to pierce or punch a hole in the substrate material prior to forming threads in the substrate. One disadvantage of a piercing point is that it will dull and will fail to pierce completely through when the substrate is a heavy gage metal. Thus it can be used only with thin or soft substrate material. Another disadvantage is that a piercing point provides no means for controlled extrusion of the substrate material. Other known fasteners include the screws shown in U.S. Pat. Nos. 3,093,028 "Mathie", 3,682,038 "Lejdegard", and 3,221,588 "Wieber", all of which are hereby incorporated by reference. These screws have a drilling point which overcomes some of the problems associated with a piercing point, but they also have cutting threads designed to cut the substrate material away in order to tap threads in the substrate, rather than extruding the hole and forming substrate threads. In most cases these fasteners require high axial end loading to accomplish point penetration and thread pick-up.

SUMMARY OF THE INVENTION

The drill and thread forming screw of the present invention includes a threaded shank portion with a head connected to the shank at one end. The head has a means for receiving a conventional driving tool to drive the screw. At the other end of the threaded shank, the screw terminates in a drill point defining a segment of a cone. The base of the cone intersects the shank approximately at the minor diameter of the threads on the shank. The drill point cone segment is preferably slightly less then one-half of an entire cone.

When axial load and torque are applied to the screw of the present invention, the drill point provides a cutting force operating normal to the cutting plane of the screw during rotation. Since the drill point cone segment is less than one-half of an entire cone, as axial load is applied, a larger percentage of load is transmitted to the cutting edge to facilitate fastener drilling than if the cone segment were a larger portion of a cone, thereby providing a higher cutting force normal to the cutting edge and allowing more rapid and controlled drilling. The supporting cutting force on the extruding edge opposite the fastener cutting edge provides an extruding effect to increase substrate material available for thread forming. The subsequently formed threads are then rolled or formed as opposed to being cut in sub-structure material. This method of forming threads provides better strength of the female threads in the sub-structure material and better material flow characteristics in the sub-structure material. The extrusion of the sub-structure material creates more material to increase fastener thread engagement which results in the fastened assembly having higher clamp loads, increases the pullout strength of the fastened assembly and reduces the tendency of the screw to strip the internal threads in the substrate.

The following detailed description of the preferred embodiment of the present invention should be read in conjunction with the accompanying drawings in which.

DETAILED DESCRIPTION OF THE PREFERRED EMBODIMENT

Figure 1A:
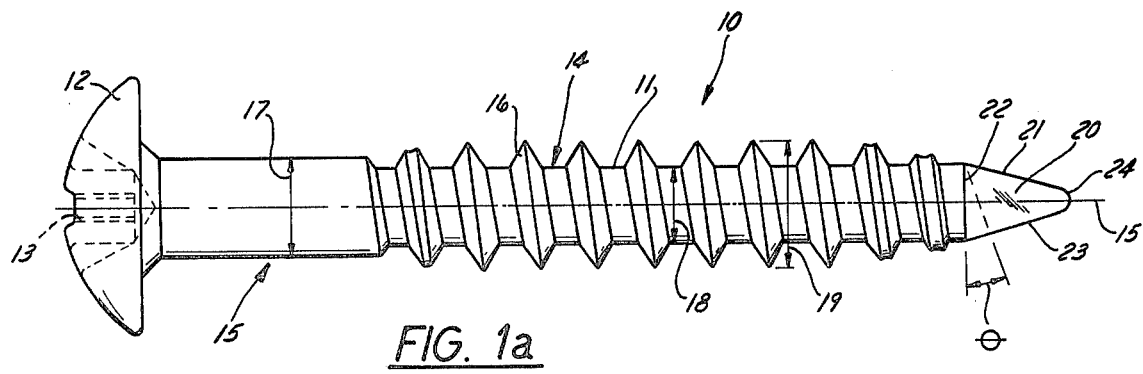
FIG. 1a is a plan view of a screw constructed according to the principles of the present invention.
Figure 1B:
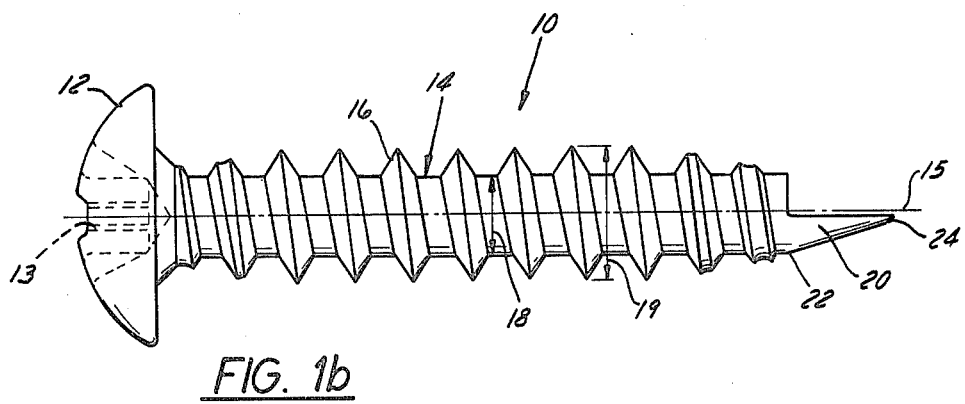
FIG. 1b is a side view of a screw constructed according to the principles of the present invention.

As shown in FIGS. 1a and 1b, the drill and thread forming screw 10 of the present invention includes a shank 14 with a head 12 attached at one end and a drill point 20 at the other. Shank 14 as shown in FIG. 1a includes threaded portion 11 and unthreaded portion 15. The shank 14 of FIG. 1b has no unthreaded portion. The head 12 has a recess 13 suitable for receiving a conventional driving tool. Other conventional types of heads including other driving means could also be used, such as a hex head. There are male threads 16 along the threaded portion 11 of shank 14. Two parameters of the male threads 16 are the major diameter 19, which is the distance between the radially outer most point of the male threads 16, and the minor diameter 18, which is the distance between the roots of the thread 16. The relationships between these parameters and the drill point will be explained hereinafter.

The drill point 20 comprises a segment of a cone having a base 22 and a point 24. The drill point 20 is attached to the shank 14 at the base 22 of the cone which intersects the shank 14 at the minor diameter 18 of the thread 16 as shown in FIG. 1a. The drill point 20 may be formed by cutting, forging or otherwise removing a portion of the cone on the original screw blank so that the resultant conical segment is less than one-half of the original cone. The conical segment is thus defined by a cutting plane parallel to and slightly beyond the longitudinal axis of the screw, such that the cutting plane intersects the outside surface of the conical segment at cutting edge 21 and extruding edge 23. In this embodiment, cutting edge 21 and extruding edge 23 are separated by an angle of approximately 30°. The conical segment thus formed provides a relatively small surface area to contact the sub-structure material during drilling, thereby producing a concentrated force normal to the cutting plane of the drill point 20, resulting in more efficient cutting action than the cutting action of drill points having larger surface areas.

The use of conventional cutting tools is appropriate to position the cut slightly past the longitudinal axis 15 of the screw 10. Preferably, the cut terminates at the base 22 of the cone so that the angle $\theta$, which for purposes of this description will be referred to as the base angle of the conical segment, is zero degrees. As a practical matter, however, it is difficult to maintain this accuracy with conventional tools. It has been found that maintaining the angle $\theta$ between about zero and fifteen degrees is acceptable.

Figure 2:
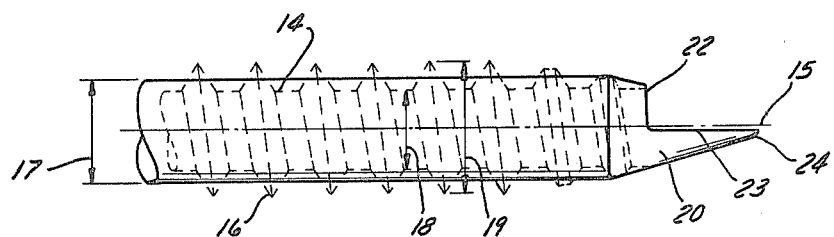
FIG. 2 is a broken away side view of a screw constructed according to the principles of the present invention showing both the screw blank and a portion of the completed screw in phantom.

It can be seen that drill point 20 is a smooth, unthreaded outer surface and that the greatest diameter of drill point 20 is at the point of intersection of drill point 20 with the shank 14. This diameter is approximately equal to the minor diameter 18 of the threaded fastener 10, which is slightly less than the fastener blank diameter 17 shown in FIG. 2. Intersection of the drill point 20 with the shank 14 at the minor diameter 18 provides that cutting edge 21 never extends farther than minor diameter 18, so that cutting of the substrate material stops at the minor diameter 18. The resulting hole diameter of the substrate material is then approximately equal to minor diameter 18. The male threads 16 then roll or form the mating female threads in the substrate material rather than cutting those threads.

Figure 3A:
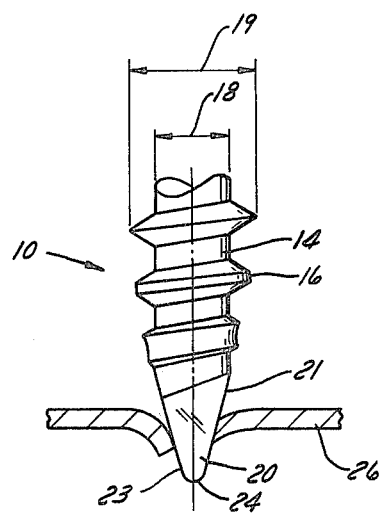
FIG. 3a is a side broken away view of the screw shown in FIG. 1 as it begins to cut into and extrude a substrate material.
Figure 3B:
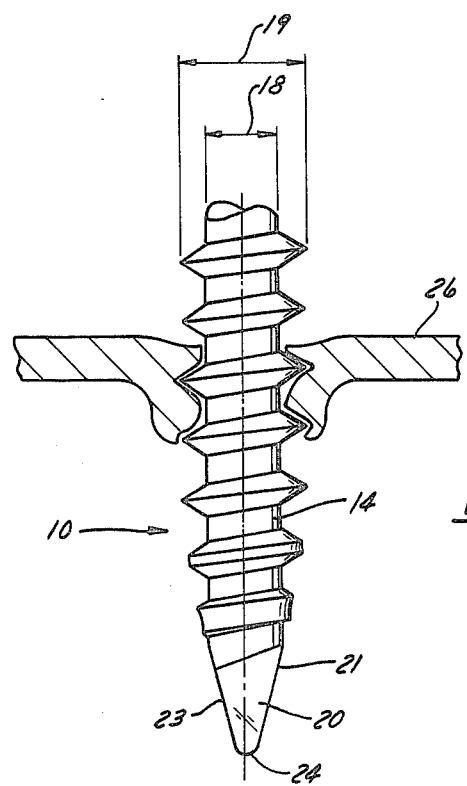
FIG. 3b is the same view as FIG. 3a, except the screw has entered further into the substrate and has formed threads in the substrate.

FIGS. 3a and 3b illustrate the cutting and extrusion of the hole followed by the formation of threads in the substrate. FIG. 3a shows drill point 20 as it begins to enter substrate 26. Cutting edge 21 cuts into substrate 26 as axial load is applied and screw 10 is rotated in a clockwise direction by means of an applied torque. As cutting edge 21 exerts a cutting force on substrate 26, extruding edge exerts a downward force tending to extrude substrate 26. Extrusion of the substrate material 26 moves more material into the area for securing the screw. The thickened portion of the substrate material which is formed by this extrusion is clearly shown in FIG. 3b.

FIG. 3b shows screw 10 and substrate 26 after screw 10 has formed female threads in substrate 26. Since cutting edge 21 terminates at approximately the minor diameter 18 of screw 10, the cutting of substrate 26 stops at minor diameter 18, and no further cutting takes place. The formation of female threads in substrate 26 occurs as male threads 16 push against substrate 26, causing deformation of substrate 26. These formed or rolled female threads have proved to be superior to cut threads in that they provide better flow characteristics in the substrate material as well as greater strength. The results of forming or rolling the female threads, while extruding the substrate material, are: greater strength, higher clamp loads, a reduced tendency of the screw to strip from the substrate material, and higher tensile pullout loads, as compared with threads which have been cut into the substrate material without a substrate extrusion process.

A test was conducted in order to compare the screw of the present invention with a screw having a point as shown in FIG. 3 of the Wieber patent, which was referred to earlier. The screws of the present invention were Rockford Products "DEX"# 12 Truss Head Phillips Zinc Plate screws having an average major diameter of 0.212 inches, an average minor diameter of 0.119 inches, a pitch of 11, and a length of 2⅝ inches. The screws of the Wieber patent were Buildex "Type S" #11 Truss Head Phillips Phosphate Finish screws, having an average major diameter of 0.204 inches, an average minor diameter of 0.120 inches, a pitch of 16, and a length of 2⅝ inches. A sample of twenty screws of each type was used for each test.

The tests were conducted on a substrate material consisting of a half inch Gypsum Board over a 20 Gauge Galvanized Channel Stud. The drill speed used was 2500 RPM. The first test involved applying a fixed axial loading on the screws, measuring the drill time, and counting the number of "no drills", which is the number of screws which failed to drill through the substrate material in 15 seconds. The results are shown below:

| Product | Axial Load lbs. | Drill Times Sec Average/Range | No Drills |
|---|---|---|---|
| Type S | 40 | 6.35/3.90–8.50 | 90% |
| DEX | 40 | 4.75/2.38–7.70 | 0% |
| Type S | 50 | 2.85/1.14–4.80 | 40% |
| DEX | 50 | 3.24/1.15–6.78 | 0% |
| Type S | 60 | 2.71/0.65–13.15 | 0% |
| DEX | 60 | 1.85/1.20–2.95 | 0 |

These results make it clear that the fastener of the present invention consistently drills through the substrate material with a lower axial load than does the screw of the Wieber patent.

The second test involved a comparison of pull-out strength between the two types of fasteners, both of which had been inserted in the substrate material described earlier. Again, twenty samples were used in each test. The average force required to pull out the "DEX" screws was 345 lbs., while the average force required to pull out the "Type S" screws was 300 lbs.

What is claimed is:

1. A drill and thread forming screw comprising: an elongated shank terminating at one end in a head and at the other end in a drill point; said shank including a threaded portion having a minor diameter and a major diameter; said drill point defining a segment of a cone having a base and a point wherein said conical segment is slightly less than one-half of the original cone and is defined by a plane parallel to and slightly beyond the longitudinal axis of the screw and also having a cutting edge and spaced therefrom an extruding edge, said cutting edge extending from said other end and terminating at said base; said base intersecting said shank at said minor diameter, wherein said screw is adapted to drill and extrude into a substrate up to said minor diameter and then to form female threads in the substrate.

2. A drill and thread forming screw as defined in claim 1, wherein said conical segment has a smooth, unthreaded outer surface.

3. A drill and thread forming screw as defined in claims 1 or 2 wherein said drill point has a base angle of between about zero degrees and fifteen degrees.

4. A drill and thread forming screw as defined in claim 1, wherein said extruding edge of said conical segment extrudes substrate material during the drilling of a hole in said substrate, and wherein said screw forms female threads in said extruded substrate material.

* * * * *